Aug. 23, 1932.  V. E. CARBONARA  1,873,284

TAKE-UP DEVICE

Filed June 13, 1929

INVENTOR.
Victor E. Carbonara
BY
Cooper, Kerr & Dunham
ATTORNEYS.

Patented Aug. 23, 1932

1,873,284

UNITED STATES PATENT OFFICE

VICTOR E. CARBONARA, OF BROOKLYN, NEW YORK, ASSIGNOR TO PIONEER INSTRUMENT COMPANY, INCORPORATED, OF BROOKLYN, NEW YORK, A CORPORATION OF NEW YORK

TAKE-UP DEVICE

Application filed June 13, 1929. Serial No. 370,518.

This invention relates to precision measuring instruments and more particularly, to a device whereby motion may be taken-up between an indicating hand and the unit which controls its motion. Hair-springs have been used for taking up motion between associated parts but their range of use is limited in view of the fact that a hair-spring may not have its ends rotated relatively to each other an amount more than about one and three-quarter revolutions without crimpling. Accordingly, their use has been limited to such instruments which are adapted for a range of use well within that permitted by a hair-spring.

Certain types of instruments are used to give indications over a considerable range and in such instruments if but a little more than one revolution of the indicating hand were permitted the individual graduations upon the dial of the instrument would be so fine as to make their reading difficult if the dial be of a reasonably small size for instrument board use. Then again, where the useful graduations for an instrument are close together the inherent errors of the instrument or the errors due to the use of average figures in graduating the instrument are much magnified. It is oftentimes advantageous to use a small dial while at the same time enabling the reading of an indicated condition to be facilitated by providing ample spacing between useful graduations. This may be accomplished by using means permitting the hand to make two revolutions for covering the range of indications equal to the range of indications covered by an indicating instrument which provides for only one revolution of its indicating hand for the same range of graduations.

It is also desirable that an instrument unit designed to control the operation of an indicating hand have its usefulness extended beyond that which is permitted by a dial having but one set of graduations about its periphery. For example, in an altimeter having graduations about its periphery up to 20,000 feet, it is evident that if the hand could continue to revolve beyond one revolution without causing disturbing influences deleterious to accurate measuring, the indicating hand could be used for determining altitude above 20,000 feet. Of course, in order to obviate the necessity of making a mental computation of addition a second scale could be provided upon the face of the dial. Thus, a second scale would read from 20,000 to 40,000 feet. In an altimeter a hairspring has been used for maintaining taut and free of lost motion the connection between the indicating hand and the unit which controls the hand. However, because of inherent properties a hair-spring may not be used to the best advantage for an altimeter which makes use of more than about one and one-quarter revolutions of the indicating hand.

Among the objects of my invention is to provide means which will enable the effective indicating range of an instrument to be useful beyond that range ordinarily permitted by the use of a single hair-spring.

For the purpose of illustrating a use of my invention I have disclosed it in association with an altimeter but I wish it to be understood that its use is not limited to any particular type of instrument since it is adapted for taking-up any play between two associated parts which are intended to move in harmony with each other in any direction and where one part is rotatively mounted for rotation through an effective range greater than that permissible by the use of but one hair-spring.

Figure 1:
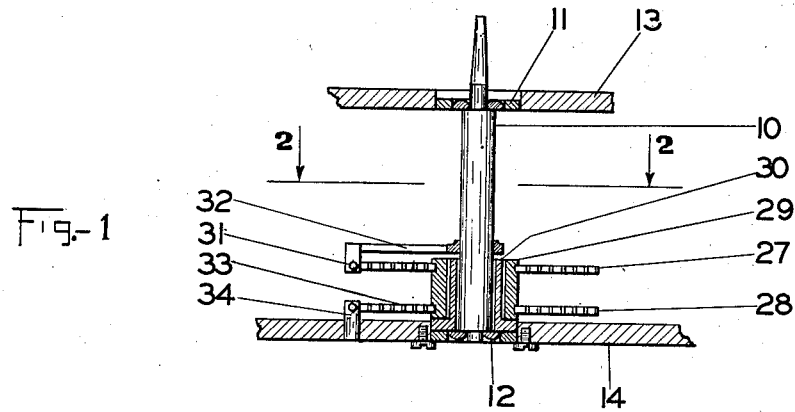
Fig. 1 is a detail of the device shown in section on line 1—1 of Fig. 2.
Figure 2:
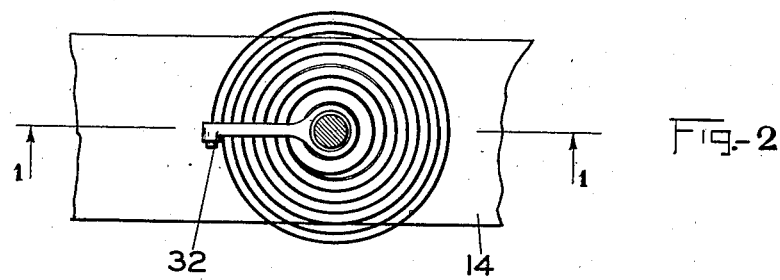
Fig. 2 is a section on line 2—2 of Fig. 1.

The structural details of the invention are clearly illustrated in Fig. 1 in which 10 is a hand-staff journaled in bearings 11, 12 which are disposed in fixed plates 13, 14 respectively. The hand-staff 10 may be identified as a controlled part which is free to turn in response to a unit which controls its position and which is itself dependent upon conditions which a particular instrument is adapted to measure. A controlled part may be any part of an instrument having connection with another part and with which it is intended to move in harmony and the invention is applicable whatever be the character of the intermediate connecting means and whether it transfers motion by pulling or by pushing.

Figure 3:
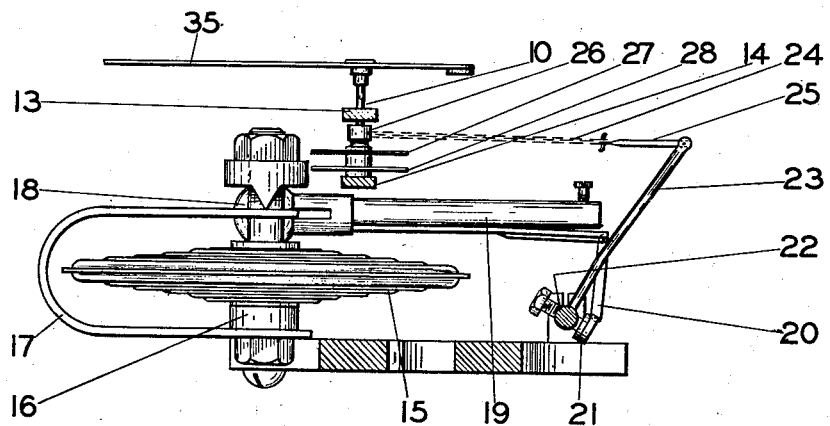
Fig. 3 illustrates the device of Figs. 1 and 2 as embodied in an altimeter.

By way of illustrating an application of the invention I have shown the hand-staff 10 under the control of a unit such as is commonly used in altimeters. This unit is illustrated in Fig. 3 and comprises an expansible box 15 formed by elastic diaphragms and from which air is partly removed. The bottom side of the box is anchored as at 16 and the top side is free to rise and fall under the action of changes in atmospheric pressure. A steel spring 17 holds the top of the box in position against external pressure by means of a short pillar 18 secured to the center of the top of the box, but at the same time the spring is sufficiently flexible to yield to any variations in pressure. The free end of spring 17 carries a rod 19 and as the expansible box 15 expands and contracts the rod 19 rises and falls and in turn controls a link 20 whose lower end is pivoted to an arm 21. Arm 21 is fixed to a pivot rod 22 to which is also fixed an arm 23. A flexible element 24 is connected to arm 23 by means of a link 25 and it is also connected to a drum 26 mounted upon hand-staff 10. As the atmospheric pressure decreases, rod 19 rises and arm 23 moves to the left. In instruments of this kind it is customary to take-up the motion of the flexible member and to rotate the hand-staff by spring means.

In accordance with the principle of my invention I provide spring means which permit at least two revolutions of the hand-staff 10 and this spring means comprises a pair of hair-springs 27, 28, each of said hair-springs having its inner end connected to a free floating member 29 in the form of a sleeve which is conveniently positioned about a bushing 30, Fig. 1. The outer end 31 of spring 27 is made fast to an arm 32 which is rigidly connected to the hand-staff 10. The outer end 33 of hair-spring 28 is connected to a post 34 which is mounted in the fixed supporting plate 14. These two springs are associated with one another so that their torsional effect is cumulative between the post 34 and the hand-staff 10, that is, the springs are wound in the same direction. Accordingly, any rotary displacement of the hand-staff 10 in respect to any fixed point will be taken up partly by the hair-spring 27 and partly by the hair-spring 28. In this manner I am enabled to utilize the cumulative effectiveness of a plurality of hair-springs without in any way unduly influencing the operation of the indicating instrument. When the hair-spring assemblage is associated with an altimeter as represented herein for convenience of illustration, sufficient initial tension is placed in the two hair-springs to enable the indicating hand 35 to be rotated over the complete range of the altimeter. In the case where an indicating hand is intended to travel two revolutions and spring means is relied upon to take-up the slack of a flexible member the end 31 of hair-spring 27 is initially displaced more than two revolutions so that for a maximum reading the flexible member will be taut.

While I have disclosed my invention as associated with an altimeter it is apparent that it has other uses in such cases where one hair-spring has been used and it is now desired to increase the effective range of the controlled part or element of such an instrument.

My invention is primarily designed for use where it will take-up motion and it is not material whether the controlling unit which actuates or controls the position of an indicating hand has a flexible element similar to that described or has a connecting element rigid in character and which operates to positively move the hand in both or one direction. By providing the hair-spring arrangement motion between the hand and its controlling unit is prevented and the hand may rotate for several revolutions depending upon the number of hair-springs connected together.

I claim:

1. The combination with a precision measuring instrument having an indicating hand mounted for movement over a dial and means having connection with said indicating hand for controlling the same, of motion take-up means operating in opposition to the means for controlling the indicating hand, said motion take-up means comprising a pair of hair-springs wound in the same direction and connected together so that their individual efforts are cumulative, means securing the unconnected end of one of the springs with the indicating hand, and means holding the unconnected end of the other of the springs in a relatively fixed position.

2. The combination with a precision measuring instrument having an indicating hand mounted for movement over a dial and means having connection with said indicating hand for controlling the same, of motion take-up means operating in opposition to the means for controlling the indicating hand, said motion take-up means comprising, a plurality of hair-springs wound in the same direction and connected together so that their individual efforts are cumulative and the movement of the end of one hair-spring may be taken up by the plurality of hair-springs, means connecting the said end of one hair-spring with the indicating hand and means fixedly holding the end of the hair-spring constituting the other end of the motion take-up means.

3. The combination in an instrument having parts which are connected together to move in harmony and means associated with one of said parts for controlling them, of a motion take-up device connected to and acting upon said parts and including a freely movable member, said motion take-up device comprising a pair of hair-springs having their inner ends secured to said freely movable member, the outer end of one of said hair-springs having connection with another of the controlled parts and the outer end of the other of said hair-springs being fixedly held.

4. In an instrument having parts which are connected together to move in harmony, the combination of means associated with one of said parts for controlling them, a motion take-up device connected to and acting upon said parts, said motion take-up device comprising a freely movable member, a hair-spring having one end anchored in a fixed position and its other end secured to said freely movable member, a second hair-spring disposed in a plane substantially parallel to the plane of first named hair-spring and also having one end secured to said freely movable member and its other end connected to another of the controlled parts, said hair-springs being initially tensioned so as to continuously operate against the controlling means.

5. In an indicating instrument having parts which are connected together to move in harmony, the combination of means associated with one of said parts for controlling them, means for preventing lost motion among said parts, said last named means comprising a pair of hair-springs, a sleeve member to which are secured the inner ends of the hair-springs, means holding the outer end of one of the hair-springs in a relatively fixed position, and means securing the outer end of the other hair-spring to another of the controlled parts which is adapted to rotate, whereby rotary movement of the last named controlled part may be caused to exceed the rotary limit of a single hair-spring.

6. The combination with a precision measuring instrument having an indicating hand rotatably mounted on a fixed support for movement over a dial and means for actuating said hand, of motion take-up means operating in opposition to said actuating means and comprising a plurality of coil springs wound in the same direction and arranged in parallel planes and connected in series relation between the indicating hand and the fixed support so that the individual functions of the springs are cumulative whereby the limit of the angular distance of travel of the indicating hand is increased.

7. In an altimeter having a pointer shaft rotatably mounted on a fixed support, the combination of a pressure-responsive member, transmission means between said pressure-responsive member and said pointer shaft for operating the latter, and motion take-up means comprising a plurality of hair-springs connected in series relation between the pointer shaft and the fixed support so that the individual functions of the springs are cumulative whereby the limit of the angular travel of the pointer shaft may exceed the rotary limit of a single hair-spring.

8. In combination, a rotatable shaft journaled in a fixed support, means for driving said shaft, and motion take-up means operating in opposition to said driving means and comprising a plurality of hair-springs connected in series relation between the rotatable shaft and the fixed support so that the individual functions of the hair-springs are cumulative whereby the limit of the angular distance of travel of the rotatable shaft is increased.

In testimony whereof I hereto affix my signature.

VICTOR E. CARBONARA.